United States Patent
Kouvelas et al.

(10) Patent No.: US 11,178,045 B2
(45) Date of Patent: Nov. 16, 2021

(54) SYSTEM AND METHOD FOR EFFICIENT ROUTE UPDATE IN AN EVPN NETWORK

(71) Applicant: Arista Networks, Inc., Santa Clara, CA (US)

(72) Inventors: Isidoros Kouvelas, Athens (GR); Rajesh Kumar Semwal, Sunnyvale, CA (US)

(73) Assignee: Arista Networks, Inc., Santa Clara, CA (US)

(*) Notice: Subject to any disclaimer, the term of this patent is extended or adjusted under 35 U.S.C. 154(b) by 123 days.

(21) Appl. No.: 16/174,201

(22) Filed: Oct. 29, 2018

(65) Prior Publication Data

US 2020/0136958 A1 Apr. 30, 2020

(51) Int. Cl.
*H04L 12/707* (2013.01)
*H04L 12/46* (2006.01)

(52) U.S. Cl.
CPC .......... *H04L 45/22* (2013.01); *H04L 12/4641* (2013.01)

(58) Field of Classification Search
CPC ......... H04L 45/22; H04L 45/50; H04L 45/66; H04L 45/24; H04L 45/28; H04L 45/245; H04L 45/00; H04L 45/04; H04L 45/507; H04L 45/74; H04L 12/4641; H04L 12/707; H04L 12/46; H04L 12/4645; H04L 12/723; H04L 12/721; H04L 12/4675; H04L 12/1886; H04L 61/6022; H04L 41/00; H04L 41/0654; H04L 41/0668; H04L 41/08; H04L 41/12; H04L 49/25; H04L 47/32
See application file for complete search history.

(56) References Cited

U.S. PATENT DOCUMENTS

| | | | | |
|---|---|---|---|---|
| 8,780,699 B1* | 7/2014 | Hasan | ........................ | H04L 1/22 370/219 |
| 8,953,590 B1* | 2/2015 | Aggarwal | ............... | H04L 45/74 370/389 |
| 9,019,814 B1* | 4/2015 | Mohanty | ................. | H04L 45/00 370/219 |
| 9,397,931 B1* | 7/2016 | Mohanty | ................. | H04L 45/48 |
| 9,860,150 B2* | 1/2018 | Singh | ....................... | H04L 12/46 |
| 10,243,821 B2* | 3/2019 | Dorai | ...................... | H04L 45/28 |
| 2007/0086361 A1* | 4/2007 | Allan | .................. | H04L 12/4625 370/254 |
| 2013/0058349 A1* | 3/2013 | Khalil | ..................... | H04L 45/12 370/400 |

(Continued)

*Primary Examiner* — Un C Cho
*Assistant Examiner* — Rasha K Fayed
(74) *Attorney, Agent, or Firm* — Chamberlain, Hrdlicka, White, Williams & Aughtry

(57) ABSTRACT

A method for operating an Ethernet virtual private network includes advertising, by a peer of the Ethernet virtual private network, virtual local area network routing information based on an integrated routing and bridging interface of the peer; making a determination that an Ethernet segment directly connecting a multi-homed host and the peer has failed; in response to the determination: withdrawing, by the peer, a first route of a first type of route associated with the Ethernet segment; maintaining, by the peer, a first route of a second type of route associated with the multi-homed host for a predetermined time after the Ethernet segment has failed; and forwarding, by the peer, a packet while the Ethernet segment has failed.

20 Claims, 11 Drawing Sheets

(56) References Cited

U.S. PATENT DOCUMENTS

| | | | |
|---|---|---|---|
| 2014/0233369 A1* | 8/2014 | Salam | H04L 41/0659 370/218 |
| 2016/0191374 A1* | 6/2016 | Singh | H04L 45/28 370/228 |
| 2017/0195210 A1* | 7/2017 | Jacob | H04L 45/74 |
| 2017/0195220 A1* | 7/2017 | Sivaraj | H04W 48/16 |
| 2018/0006995 A1* | 1/2018 | Bickhart | H04L 45/66 |
| 2018/0183654 A1* | 6/2018 | Patel | H04L 45/28 |
| 2018/0302321 A1* | 10/2018 | Manthiramoorthy | H04L 49/1569 |
| 2019/0149456 A1* | 5/2019 | Brissette | H04L 12/462 370/225 |
| 2020/0127885 A1* | 4/2020 | Arora | H04L 41/0686 |
| 2020/0127919 A1* | 4/2020 | Nagarajan | H04L 45/64 |

* cited by examiner

SYSTEM AND METHOD FOR EFFICIENT ROUTE UPDATE IN AN EVPN NETWORK

BACKGROUND

Packets, or other network data units, within a network may be routed and/or switched by peers from a source to a destination. Any number of links may interconnect components of the network. Failures of the links may dynamically change the topology of the network. Reconfiguring the network in response to the failures may consume computing resources and time.

SUMMARY

In one aspect, a method for operating an Ethernet virtual private network in accordance with one or more embodiments of the invention includes advertising, by a peer of the Ethernet virtual private network, virtual local area network routing information based on an integrated routing and bridging interface of the peer; making a determination that an Ethernet segment directly connecting a multi-homed host and the peer has failed; in response to the determination: withdrawing, by the peer, a first route of a first type of route associated with the Ethernet segment; maintaining, by the peer, a first route of a second type of route associated with the multi-homed host for a predetermined time after the Ethernet segment has failed; and forwarding, by the peer, a packet while the Ethernet segment has failed.

In one aspect, a non-transitory computer readable medium in accordance with one or more embodiments of the invention includes computer readable program code, which when executed by a computer processor enables the computer processor to perform a method for operating an Ethernet virtual private network, the method including advertising, by a peer of the Ethernet virtual private network, virtual local area network routing information based on an integrated routing and bridging interface of the peer; making a determination that an Ethernet segment directly connecting a multi-homed host and the peer has failed; in response to the determination: withdrawing, by the peer, a first route of a first type of route associated with the Ethernet segment; maintaining, by the peer, a first route of a second type of route associated with the multi-homed host for a predetermined time after the Ethernet segment has failed; and forwarding, by the peer, a packet while the Ethernet segment has failed.

In one aspect, a peer of an Ethernet virtual private network in accordance with one or more embodiments of the invention includes a forwarding table and a processor. The processor advertises virtual local area network routing information based on an integrated routing and bridging interface of the peer stored in the forwarding table; makes a determination that an Ethernet segment directly connecting a multi-homed host and the peer has failed; in response to the determination: withdraws a first route of a first type of route associated with the Ethernet segment; maintains a first route of a second type of route associated with the multi-homed host for a predetermined time after the Ethernet segment has failed; and forwards a packet while the Ethernet segment has failed using the forwarding table.

DETAILED DESCRIPTION

Figure 1:
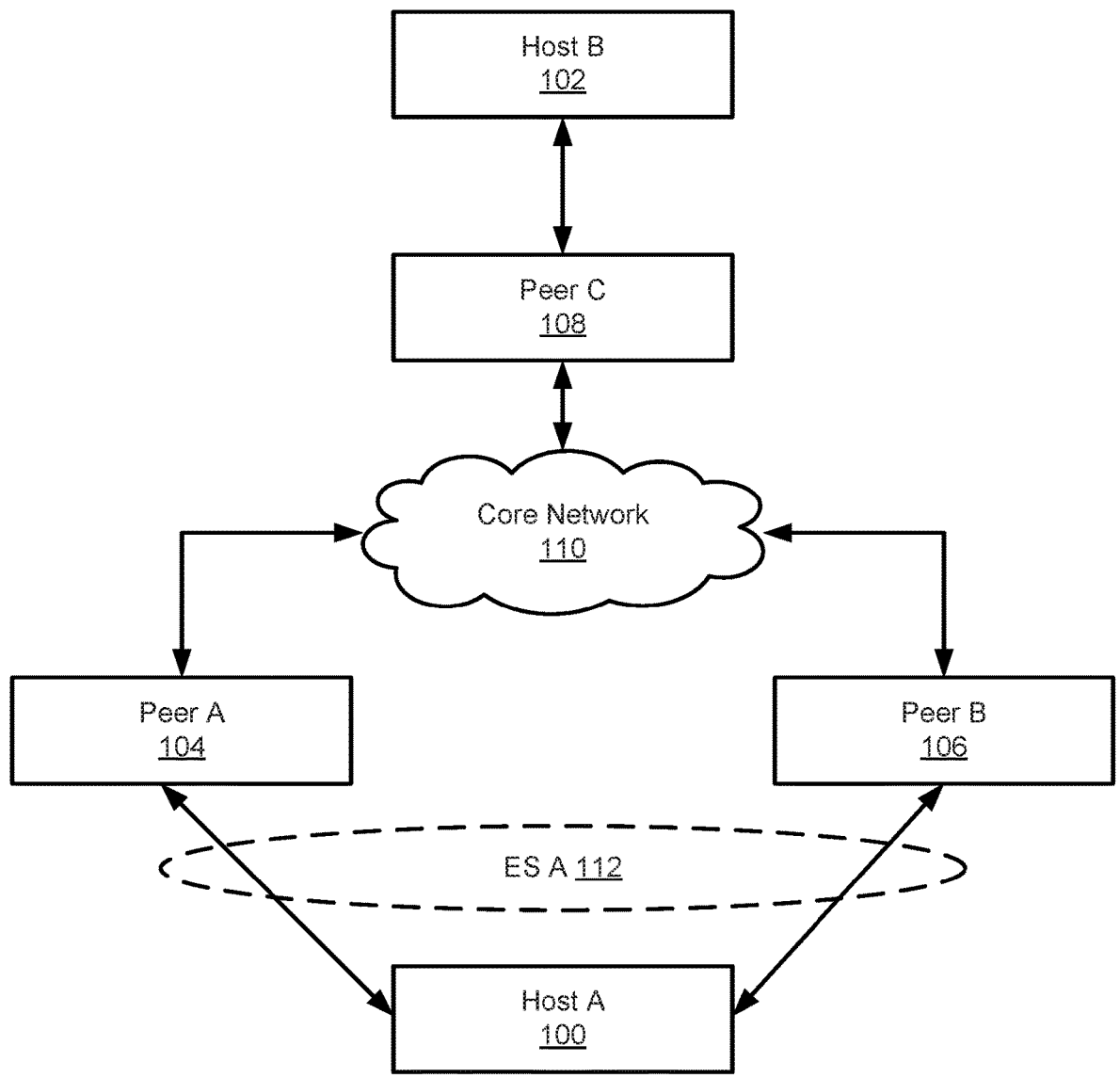
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system and method for processing network communications. The network communications may include packets or any other types of network data units transmitted via a network. More specifically, embodiments of the invention relate to a method and system for processing Ethernet virtual private network communications in a dynamic environment. By performing specific types of route advertisement, contrary to established practices, various embodiments of the invention enable network connectivity to be restored in less time and at lower resource cost when compared to contemporary methods of restoring network communications.

In one embodiment of the invention, peers of an Ethernet virtual private network advertise a subnet internet protocol prefix route associated with their integrated routing and bridging interfaces as a type-5 route. By doing so, embodiments of the invention may ensure that packets, e.g., traffic, or other types of network data units can continue to be forwarded when an Ethernet link has failed and the network has not recovered from the Ethernet link failure.

In one embodiment of the invention, peers continue to advertise a type-2 route associated with a failed Ethernet link, e.g., a stale route, even after withdrawing a type-1 route associate with the failed Ethernet link. By doing so embodiments of the invention may provide a method for recovering connectivity to a multi-homed host in less time and at lower resource cost, e.g., processing resources, memory resources, bandwidth, than contemporary methods that withdraw type-2 routes associated with failed Ethernet links. While described above as being used in conjunction with Ethernet virtual private networks, embodiments of the invention may be used with and/or applied to other types of network topologies as well as addressing different problems or providing different advantages from those discussed above.

FIG. 1 shows a system in accordance with one or more embodiments of the invention. The system includes peers (104, 106, 108) operatively connected through a core network (110). The peers (104, 106, 108) and core network (110) may facilitate communications between any number of hosts (e.g., 100, 102), each of which may be directly connected to one or more of the peers (104, 106, 108). Each of these components is described below.

In one embodiment of the invention, the peers (104, 106, 108) are physical devices. The physical devices may be, for example, switches, routers, or multilayer switches. The physical devices may be other types of computing devices without departing from the invention. Each of the peers may include persistent storage (e.g., hard disk drives, solid state disk drives, etc.), memory (e.g., random access memory (RAM), shared memory), one or more processor(s) (e.g., central processing units including any number of cores) for processing data, one or more communication processors (e.g., a switch chip, a network processor, etc.), and/or two or more physical network interfaces or ports. The peers (104, 106, 108) may have additional, fewer, and/or different components without departing from the invention. For example, the functionality of the processor(s) and the communication processors may be integrated into a single device without departing from the invention. Each of the aforementioned components may be implemented as physical components including circuitry.

The communication processor(s) (not shown) may include egress and ingress ports that may connect to the physical network interfaces or ports on the peers (104, 106, 108). The communication processor may determine out of which egress port on the peer (104, 106, 108) to forward media access control (MAC) frames. For example, packets may be received by the communication processor via ingress ports, analyze the packets, and select egress ports for forwarding all and/or a portion of the packets. Further, each physical network interface or port may or may not be connected to another component (e.g., a host (100, 102) or to another peer (104, 106, 108) in the core network (110).

A peer (104, 106, 108) may be configured to support Ethernet virtual private network communications (EVPN). To support EVPN communications, each peer (104, 106, 108), may receive packets via the network interfaces or ports, and determine whether to: (i) drop the packets; (ii) process the packets in accordance with one or more embodiments of the invention, and/or (iii) send the packets, based on the processing, out another network interface or port on the peer (104, 106, 108) in accordance with one or more embodiments of the invention. The peer (104, 106, 108) may be configured to support other types of communications without departing from the invention. For example, the peer (104, 106, 108) may support any type of encapsulation usable for EVPN communications. For example, the peer (104, 106, 108) may support virtual extensible local area network communications, multiprotocol label switching communications, or other types of communication protocols without departing from the invention.

For example, peer A (104) may be configured to receive packets from Host A (100) via Ethernet segment A (112). When received, peer A (104) may analyze the packets and forward the packets over the core network (110) toward peer C (108) when the packets is directed toward host B (102). Peer A (104) may identify that the packets are directed toward host B (102) based on the content of a header or other portions of the packets that include network control information such as a media access control address. The network control information may be other types of network control information, other than a MAC address without departing from the invention.

In one or more embodiments of the invention, each peer (104, 106, 108) includes functionality for Integrated Routing and Bridging (IRB). Each peer (104, 106, 108) may include an IRB interface that facilitates routing of communications between virtual local area networks of the EVPN. For example, Peer A (104), Peer B (106), and Host A (100) may be members of a first virtual local area network while peer C (108) and host B (102) may be members of a separate virtual local area network. In such a scenario, Peer A (104) may bridge packets to Peer B (106) and route packets to Peer C (108).

In one or more embodiments of the invention, each peer (104, 106, 108) includes a forwarding table. The forwarding table may be a data structure that includes information that enables the peer to determine to which entity to forward packets. For example, the forwarding table may include associations between control information included in the packets and egress ports of the peer. When packets are received, the control information in the packets may be compared to entries of the forwarding table and/or other data structures to identify an egress port. As will be discussed in further detail below, the content of the forwarding table may be populated using routes obtained by the respective peer and/or using route advertisements received from other peers.

In one or more embodiments of the invention, each peer (104, 106, 108) may include encapsulation data structures. The encapsulation data structures may include information that enables the peer (104, 106, 108) to encapsulate messages received from the hosts or other entities. Once encapsulated, the messages may be transmitted to other peers via the core network (110). Different encapsulation data structures may be used depending on the type of encapsulation technology utilized in the system of FIG. 1.

For example, when a packet, e.g., an Ethernet packet, is received from one of the hosts, the packet may be encapsulated before being forwarded via the core network. In a scenario in which a multiprotocol label switching communications protocol is used, the packet may be encapsulated using a multiprotocol label switching tag before being forwarded to the core network. Once received by the core network, the forwarding behavior of the core network may depend upon the multiprotocol label switching tag encapsulating the packet. The core network may forward the encapsulated packet to a second peer based on the content of the multiprotocol label switching tag. When received by the second peer, the second peer may remove the encapsulation, i.e., remove the multiprotocol label switching tag, and forward the packet to a second host based on the content of the packet.

While the forwarding behavior of the peers and core network has been describe above with respect to multiprotocol label switching, the forwarding behavior of the peers and core network may be performed in accordance with other protocols without departing from the invention.

While the peers (104, 106, 108) have been described as performing forwarding based on a forwarding table, the peers may utilize any number and/or type of data structures for performing routing and/or bridging of packets without departing from the invention. For example, each peer may include separate tables for routing and/or bridging packets with respect to each portion of the network topology. The peers may include a routing table for sending packets across the core network (110) and bridging tables for sending packets beyond the core network toward the hosts. In such a scenario, an IRB interface may be used by each peer to support IRB communications via the interfaces.

In one or more embodiments of the invention, each peer (104, 106, 108) is configured to advertise its connectivity and/or network identification information to other peers. To advertise, each peer (104, 106, 108) may send packets over the core network (100) or other portions of the network of FIG. 1. The packets may include the connectivity and/or network identification information. Advertising the connectivity and/or network identification information may enable each of the peers (104, 106, 108) to configure its packet forwarding behavior to facilitate EVPN communications across the system of FIG. 1.

In one or more embodiments of the invention, each peer (104, 106, 108) advertises different types of routes to indicate its connectivity within the network. The peers (104, 106, 108) may advertise one or more type-1 routes, type-2 routes, and type-5 routes. The peers (104, 106, 108) may advertise other types of routes in addition to or in substitution for the aforementioned types without departing from the invention.

A type-1 route may be advertised for multi-homed Ethernet segments. Thus, when a peer is not directly connected to a multi-homed host via an Ethernet segment, the peer may not advertise a type-1 route. The advertisement for a type-1 route may include a route distinguisher, an Ethernet segment identifier, Ethernet tag identifier, and a label. In a scenario in which the core network (110) is a multiprotocol label switching (MPLS) network, the label may be a MPLS label. Type-1 routes may include additional and/or different information regarding the network topology or components of the network without departing from the invention. For example, depending on the overlay routing technology, e.g., virtual extensible local area networking, different types of routes may include different information usable for packet routing purposes.

In one or more embodiments of the invention, type-1 routes are identified by peers via advertising. For example, the type-1 routes of each peer may be advertised to other peers.

A type-2 route may be advertised by any peers connected to hosts and/or peers. The advertisement for a type-2 route may include a route distinguisher, an Ethernet segment identifier, Ethernet tag identifier, a media access control length, a media access control address, an Internet protocol address, and Internet protocol address length, and at least one label. In a scenario in which the core network (110) is a MPLS network, the at least one label may be a MPLS label. The Internet protocol address may be associated with the media access control address. Similarly, the label may also be associated with the media access control address. The associations between the at least one label, the internet protocol address, and the media access control address, respectively, may be identified using discovery procedures such as, for example, snooping or performing an Address Resolution Protocol (ARP). Type-2 routes may include additional, less, and/or different information regarding the network topology or components of the network without departing from the invention. For example, a type-2 route may not include an Internet protocol address without departing from the invention.

A type-5 route may be advertised by any peers connected to hosts and/or peers. The advertisement for a type-5 route may include a route distinguisher, an Ethernet segment identifier, and/or an Ethernet tag identifier. The IRB interface identifier may be, for example, an Internet protocol prefix for the virtual local area network in which the peer resides. For example, with respect to the topology of FIG. 1, Peer A (104) may advertise a type-5 route and include an IRB interface for routing packets towards both Peer A (104) and Peer B (106). Similarly, Peer B (106) may advertise a second type-5 route and include its local IRB interface for routing packets towards both Peer A (104) and Peer B (106). In such a scenario, both type-5 routes may include the same internet protocol prefix. Peer C (108) may utilize equal cost multi-pathing (ECMP) or other algorithms for dividing the network load across both paths via peers A and B. Type-5 routes may include additional, less, and/or different information regarding the network topology or components of the network without departing from the invention. In one or more embodiments of the invention, virtual local area network routing information may include all or a portion of the information included in a type-5 route advertisement.

In one embodiment of the invention, the persistent storage on each peer (104, 106, 108) includes any type of non-transitory computer readable medium that includes instructions, which, when executed by the one or more processor(s), enable the peers (104, 106, 108) to perform any of the functionalities described below in FIGS. 2A-3B. The instructions may include functionality to implement core network routing such as MPLS, network discovery protocols such as Border Gateway Protocol (BGP), and network wide routing such as EVPN routing. The functionality of the peers is not limited to the aforementioned examples. For example, the peers may support other network discovery protocols that use different types of routes other than type-1, type-2, and type-5 routes. In such a scenario, the peers (104, 106, 108) may implement methods similar to those illustrated in FIGS. 2A-3B but using the different types of routes and/or other information regarding the network topology to perform network discovery.

In one embodiment of the invention, hosts (100,102) are systems (e.g., software and computer hardware) that are configured to generate, send, receive, and/or process requests and replies either locally or over a network using software and computer hardware. A host (100,102) may include one or more processor(s), memory, and one or more physical network interface(s). Further, a host (100,102) may include functionality to generate, receive, and/or transmit packets over an EVPN network, or other type of network. Examples of hosts (100,102) include, but are not limited to, servers (e.g., a database server, a dynamic host configuration protocol (DHCP) server, an application server, a file server, a print server, a mail server, or any other server), desktop computers, mobile devices (e.g., a laptop computer, a smart phone, a personal digital assistant, a tablet computer, or any other mobile device), or any other type of computing device with the aforementioned requirements.

In one embodiment of the invention, the core network (110) may be a set of interconnected network elements or systems (not shown), which operatively connect the peers (104, 106, 108) of the system. In one or more embodiments of the invention, the core network (110) includes functionality to facilitate communications between these aforementioned components using the MPLS protocol. The core network (110) may communicate using other protocols such as, for example, virtual extensive local area network protocol without departing from the invention. The core network (110) may include any combination of local area network (LAN) and/or wide area network (WAN) segments, such as the Internet, which may employ any combination of wired and/or wireless connections and communication protocols. In one embodiment of the invention, a network element may be a router, a switch, or a multi-layer switch.

In one embodiment of the invention, Host A (100) is multi-homed to peer A (104) and peer B (106). Accordingly, Host A (100) may communicate with Peer A (104) and Peer B (106) via the links that are part of Ethernet Segment A (112). From the perspective of Host A (100), the links to Peer A and B, which are part of Ethernet segment A (112), appear as a link aggregation group (LAG).

While FIG. 1 shows a configuration of components, other system configurations may be used without departing from the scope of the invention.

FIGS. 2A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-3B may be performed in parallel with any other steps shown in FIGS. 2A-3B without departing from the scope of the invention.

Figure 2A:
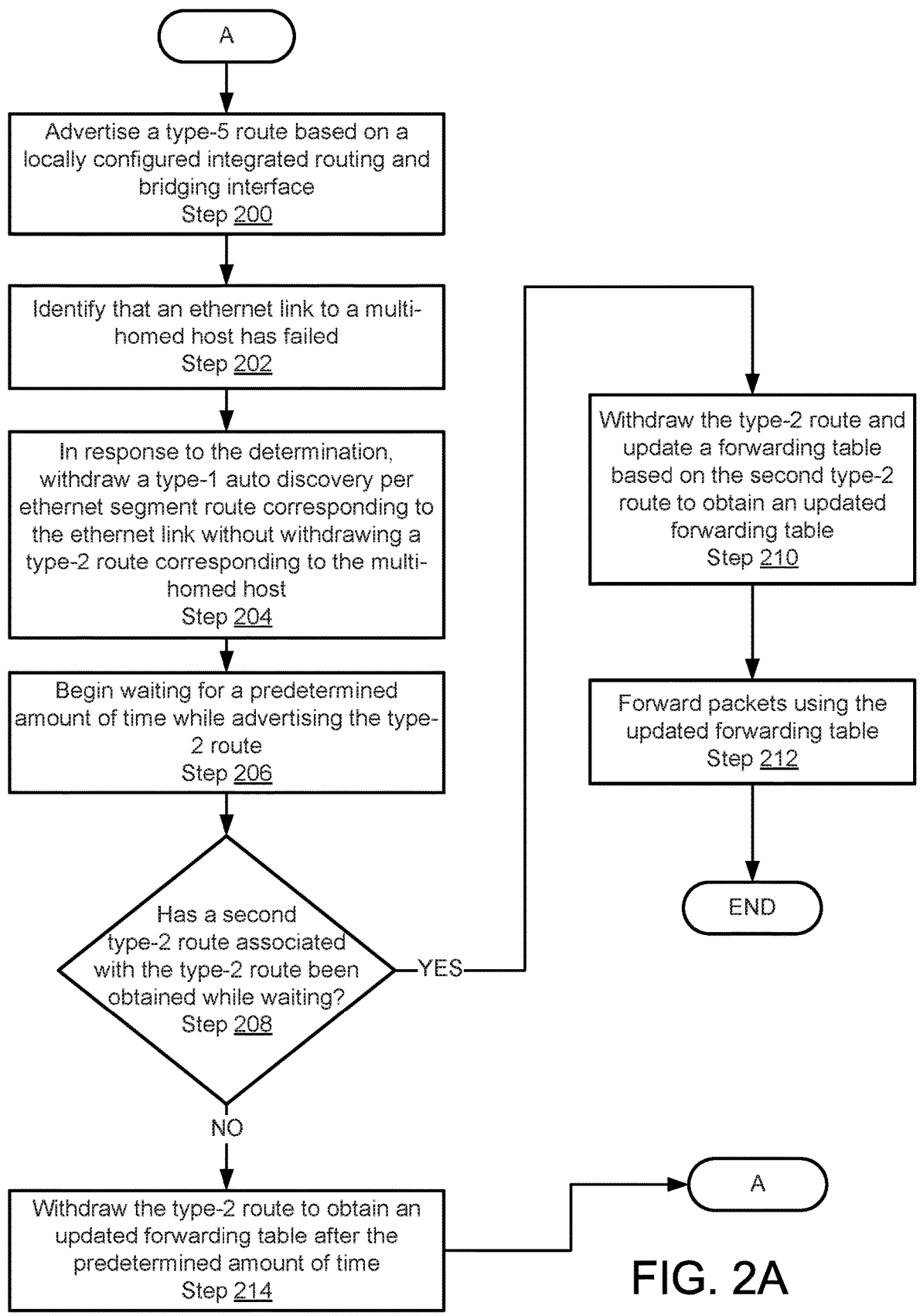
FIG. 2A shows flowchart of a method of forwarding packets in accordance with one or more embodiments of the invention.

Turning to FIG. 2A, FIG. 2A shows a method for performing packet forwarding in accordance with one or more embodiments of the invention. The method of FIG. 2A may be performed by, for example, a peer (104, 106, 108, FIG. 1).

In Step 200, a type-5 route based on a locally configured IRB interface is advertised. In one or more embodiments of the invention, the peer performing the method of FIG. 2A includes an IRB interface and is directly connected to a multi-homed host via an Ethernet link of an Ethernet segment. In one or more embodiments of the invention, the IRB interface is configured with an Internet protocol prefix that is used to route packets toward the peer and a second peer that is also directly connected to the multi-homed host. In other words, the Internet protocol prefix may be used to route packets towards the virtual local area network that includes at least two peers connected to the multi-homed host.

In one or more embodiments of the invention, the IRB interface is advertised by sending updates to other peers to which the peer performing the method of FIG. 2A is connected. For example, with respect to FIG. 1, if Peer A is performing the method of FIG. 2A, Peer A may advertise the route to both of Peers B and C.

In Step 202, an Ethernet link between the peer and the multi-homed host is identified as failed. In one or more embodiments of the invention, a failed Ethernet link indicates that a portion of the connectivity of an Ethernet segment is inoperable. For example, with respect to FIG. 1, an Ethernet link failure between Host A (100) and Peer A (104) may result in the connectivity between the aforementioned components being severed while the connectivity between Host A (100) and Peer B (106) remains functional. Thus, a failed Ethernet segment in the context of a multi-homed host may indicate that only one of multiple links supported by the Ethernet segment are inoperable.

In one or more embodiments of the invention, the peer identifies that the Ethernet link has failed when it does not receive confirmations in response to packets sent by the peer to a host on the other end of the Ethernet link. When confirmations from the host are not received in response to sending the packets, the peer may identify the Ethernet link as inoperable. The Ethernet link may fail under different scenarios and the detection of the Ethernet link failure may be based on different information without departing from the invention. For example, the Ethernet link may fail due to a failure of a carrier. In such a scenario, the Ethernet link failure may be identified based on different information, i.e., the failure of the carrier, rather than the failure of receiving confirmations in response to sent packets.

In Step 204, a type-1 auto discovery per Ethernet segment route corresponding to the Ethernet link is withdrawn without withdrawing a type-2 route corresponding to the multi-homed host. Both of the aforementioned routes may be advertised prior to Step 204. In one or more embodiments of the invention, the type-1 route is withdrawn by sending an update to the other peers that the type-1 route is no longer available. In one or more embodiments of the invention, withdrawing the type-1 route may modify the routing and/or bridging table of the peer to prevent packets from being attempted to be sent over the Ethernet link that is identified as failed. For example, withdrawing the type-1 route may prevent packets received by the peer to be forwarded to the host via the failed Ethernet link of the Ethernet segment. In this example, the withdrawal of the type-1 route may have routing consequences for other hosts and peers. Packets destined for the multi-homed host may be routed to the host via other peers than the peer that withdrew the type-1 route.

In Step 206, the peer begins waiting for a predetermined amount of time while advertising the type-2 route. In one or more embodiments of the invention, the predetermined amount of time may be one advertising cycle. An advertisement cycle may be period of time in which a peer may advertise their routes, e.g., type-1, type-2, and/or type-5 routes. The predetermined amount of time may be other periods of time without departing from the invention. For example, the predetermined amount of time may be a set amount of time such as, for example, 100 milliseconds, 1 second, etc.

In one or more embodiments of the invention, the peer advertises the type-2 route by sending updates to other peers. The updates may include a binding, e.g., media access control to Internet protocol address relationship. In one or more embodiments of the invention, the peer advertises the type-2 route to a second peer that is connected to the multi-homed host via the Ethernet segment. By doing so, the second peer may obtain the binding and other information included in the type-2 route without having to resort to other discovery mechanisms such as, for example, snooping packets to obtain the binding which may be a time consuming, time indeterminate, and/or inefficient process. As will be discussed with respect to FIGS. 3A-3B, the second host may be configured to utilize the advertised type-2 route to generate an advertisement for a route. Doing so may reduce the time required for the peer to generate the advertisement when compared to contemporary methods of generating advertisements that require the use of discovery protocols.

In one or more embodiments of the invention, the type-2 route is a stale route at Step 206. In other words, the peer may be intentionally advertising a stale type-2 route because the peer is no longer capable of forwarding packets to the multi-homed host because of the Ethernet link failure.

In Step 208, a determination is made about whether a second type-2 route associated with the type-2 route has been obtained while waiting the predetermined amount of time.

If the second type-2 route is obtained while waiting the predetermined time, the method may proceed to Step 210. If the second type-2 route is not obtained while waiting the predetermined amount of time, the method may proceed to Step 214.

In one or more embodiments of the invention, if the second type-2 route is obtained during the predetermined amount of time, the method immediately proceeds to Step 210 without waiting the remainder of the predetermined amount of time. In other words, obtaining of the second type-2 route may interrupt Step 206 and cause the method to immediately proceed to Step 210. Steps 208 and 206 may be performed concurrently.

In one or more embodiments of the invention, the second type-2 route is obtained via an advertisement. The advertisement may be from the second peer connected to the host via the Ethernet segment.

In one or more embodiments of the invention, the second type-2 route is validated by the peer. If the second type-2 route is not valid, the type-2 route in the advertisement is ignored and the peer continues waiting the predetermined amount of time. In other words, if the second type-2 route is not a valid route, the peer proceeds as though it did not obtain the second type-2 route.

In one or more embodiments of the invention, a valid second type-2 route includes media access control address and an internet protocol address. These addresses may be included in the advertisement. For example, as described with respect to FIG. 1, a type-2 route may include both of these addresses.

In one or more embodiments of the invention, an association between the type-2 route and the second type-2 route is identified based on the information included in each type-2 route. For example, as described with respect to FIG. 1, type-1 and type-2 routes may both include route identification information, e.g., an Ethernet segment identifier, an Ethernet tag identifier, etc. The identification information in both type-2 routes may be compared and, when a match is found, a prospective type-2 route may be identified as the second type-2 route based on the match. Other type-2 routes that do not have matching identification information may be ignored, e.g., not identified as the second type-2 route. For example, type-2 route advertisements for other Ethernet segments of the network topology of FIG. 1 may be received during the predetermined period of time that are not the second type-2 route.

In Step 210, the type-2 route is withdrawn and a forwarding table is updated based on the second type-2 route to obtain an updated forwarding table.

In one or more embodiments of the invention, the type-2 route is withdrawn by sending a notification to the other peers that the type-2 route is no longer valid. In other words, a notification that the other peers should not forward packets along a route that utilizes the Ethernet link of the Ethernet segment that is both associated with the type-2 route and the peer sending the notification. By doing so, the other peers may be able to update their respective routing tables to prevent sending packets to the peer that requires the use of the Ethernet link of the Ethernet segment that has failed.

In one or more embodiments of the invention, the forwarding table is updated based on the second type-2 route by replacing a portion of the forwarding table with new forwarding information based on the second type-2 route. For example, the type-2 route may indicate that the second peer, that sent the second type-2 route, has connectivity to forward packets to the multi-homed host via the second peer. The peer may update its routing table to forward and/or bridge packets destined for the multi-homed host to the second peer based on the second type-2 route.

In Step 212, packets are forwarded using the updated forwarding table. In one or more embodiments of the invention, the packets are forwarded by directing packets based on the updated portion of the updated forwarding table. The method may end following Step 212.

Returning to Step 208, the method may proceed to Step 214 following Step 208. In Step 214, the type-2 route is withdrawn to obtain an updated forwarding table after the predetermined amount of time.

In one or more embodiments of the invention, the type-2 route is withdrawn by sending a notification to the other peers that the type-2 route is no longer valid. In other words, a notification that the other peers should not forward packets along a route that utilizes the Ethernet link of the Ethernet segment that is both associated with the type-2 route and the peer sending the notification. By doing so, the other peers may be able to update their respective routing tables to prevent sending packets to the peer that requires the use of the Ethernet link of the Ethernet segment that has failed.

Figure 2B:
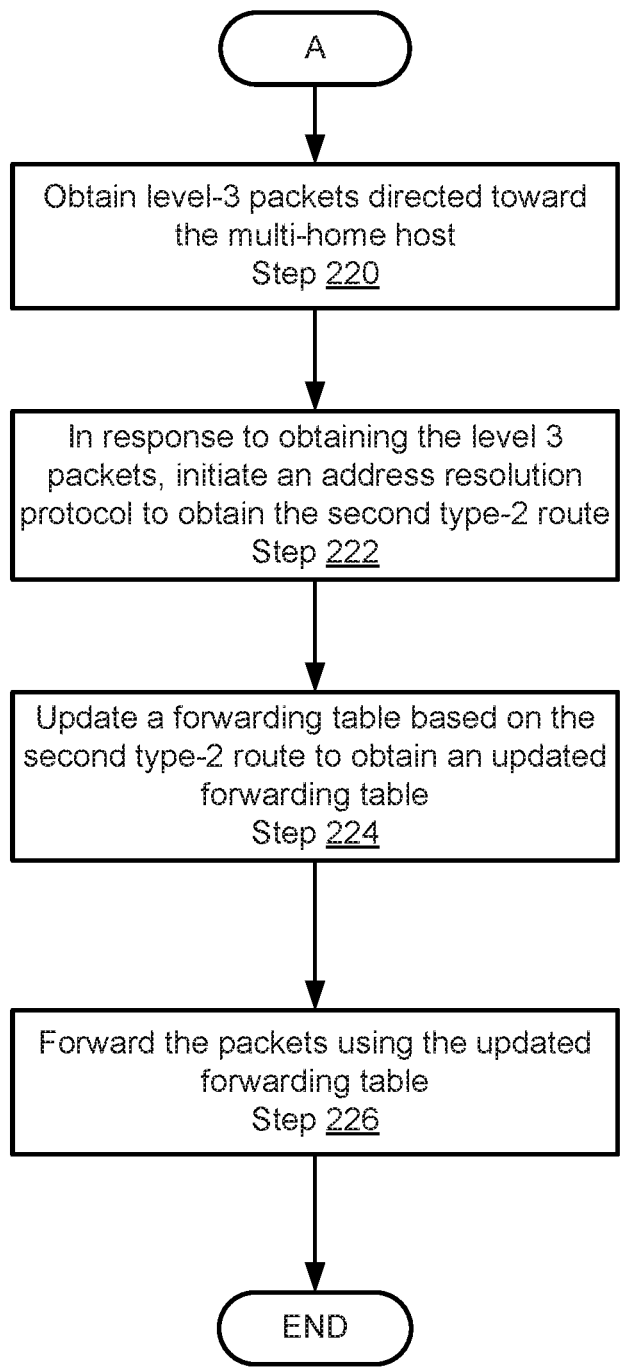
FIG. 2B shows a continuation of the flowchart of FIG. 2A.

The method may proceed to Step 220 of FIG. 2B following Step 214.

Turning to FIG. 2B, FIG. 2B shows a continuation of the method for performing packet forwarding of FIG. 2A in accordance with one or more embodiments of the invention.

In Step 220, layer-3 packets directed toward the multi-homed host is obtained. In one or more embodiments of the invention, the layer-3 packets are obtained from a third peer. The third peer may only be connected to the peer via a core network.

In one or more embodiments of the invention, the layer-3 packets are packets from a second host directed toward the multi-homed host. The layer-3 packets may be directed toward the multi-homed host based on the type-5 route advertised in Step 200. In other words, the second host may send packets to the third host, i.e., located in the same virtual local area network as the first host. After the type-1 and type-2 routes are withdrawn, the third host may forward the packets toward the multi-homed host using the type-5 route. In such a scenario, the packets may be forwarded toward the peer and the second peer because of equal cost multi-path or other load distribution algorithm.

In Step 222, an address resolution protocol is initiated in response to the obtained level 3 packets in order to obtain the second type-2 route. The type-2 route may be obtained by constructing the type-2 route using the media access control address corresponding to the internet protocol address that packets of Step 220 are destined. In one or more embodiments of the invention, initiating the address resolution protocol causes the second peer to send the second type-2 route to the peer. Initiating the address resolution protocol may include sending a notification to other peers and/or components of the system of FIG. 1. The notification may include an identifier of intended recipient of the layer-3 packets. The media access control address may be obtained by completing the address resolution protocol.

For example, initiating the address resolution protocol for the layer-3 packets may cause the second peer and/or other components of the system of FIG. 1 to identify whether each component has connectivity that may be used to forward the layer-3 packets to the multi-homed host. Any component that has such connectivity may send an advertisement in response to receiving the address resolution protocol initiation.

In Step 224, the forwarding table of the peer is updated based on the second type-2 route to obtain an updated forwarding table as discussed in Step 210 of FIG. 2A.

In Step 226, packets are forwarded using the updated forwarding table as described in Step 212 of FIG. 2A. The method may end following Step 226.

In one or more embodiments of the invention, the method illustrated in FIGS. 2A-2B decreases the amount of time required to reconfigure the network of FIG. 1 after an Ethernet link of an Ethernet segment failure for packet forwarding purposes when compared to contemporary methods of reconfiguring such networks. For example, by continuing to advertise the type-2 route associated with the Ethernet link after the link has failed, other peers may obtain the binding between the Internet protocol address and the media access control address via the advertisement, i.e., an update, rather than having to resort time consuming and network resource consuming network discovery protocols. By doing so, embodiments of the invention may provide an improved network packet forwarding method that is more computationally and time efficient than contemporary methods. Similarly, advertising the IRB interface via the type-5 route advertisement may similarly decrease the amount of time and computation required for network discovery in scenarios in which a multi-homed host operates. For example, without advertisement of the IRB interface via the type-5 route, a second host attempting to send packets toward the multi-homed host would have to perform a network discovery protocol. In contrast, advertising the IRB interface via the type-5 route in accordance with one or more embodiments of the invention enables the Peer forwarding the packets from the second host to immediately continue forwarding packets toward the multi-homed host using the type-5 route even when both the type-1 and type-2 routes associated with the failed Ethernet link are withdrawn.

Figure 3A:
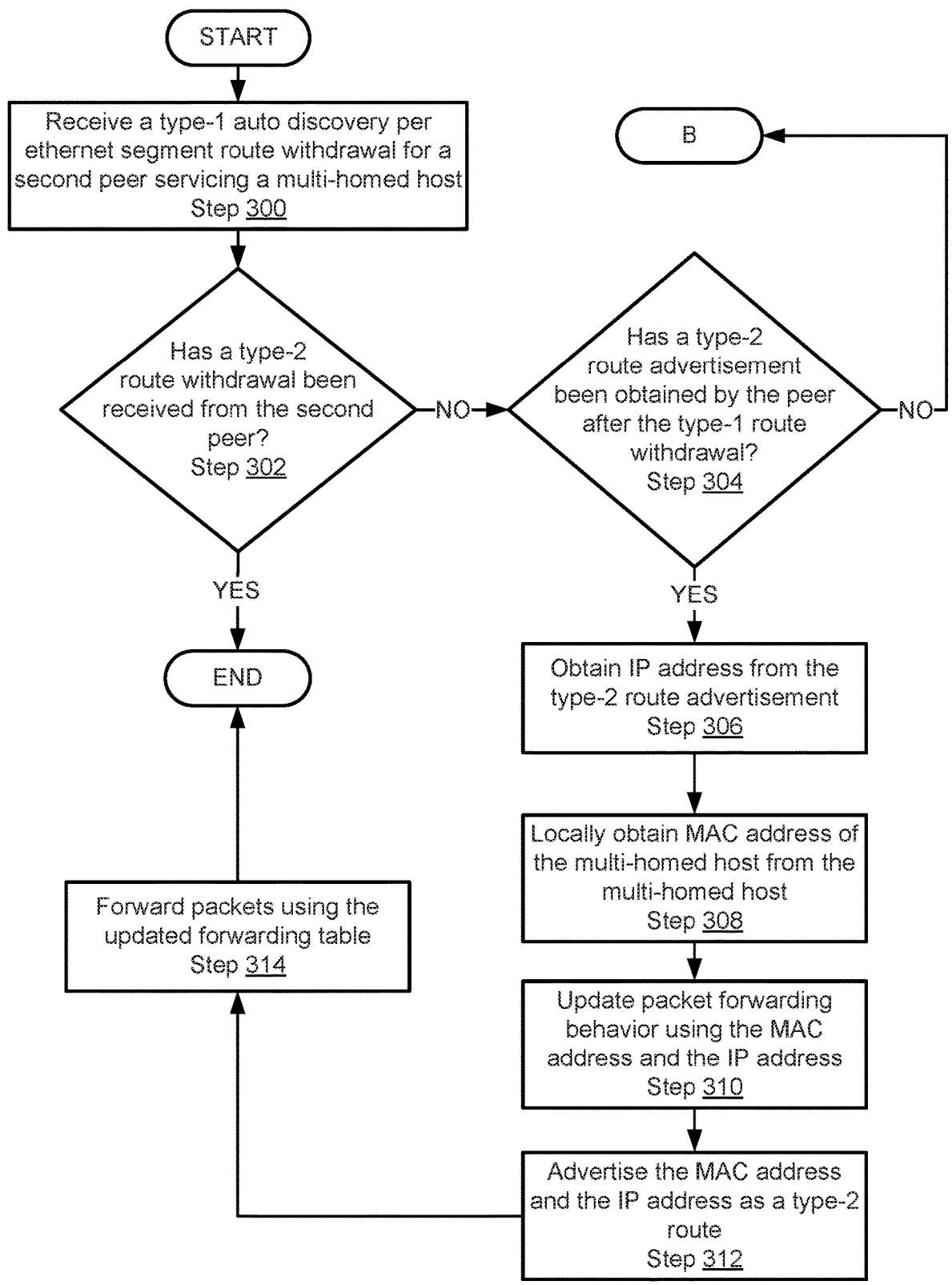
FIG. 3A shows flowchart of a second method of forwarding packets in accordance with one or more embodiments of the invention.

Turning to FIG. 3A, FIG. 3A shows a method for performing packet forwarding in accordance with one or more embodiments of the invention. The method of FIG. 3A may be performed by, for example, a peer (104, 106, 108, FIG. 1).

In Step 300, a type-1 auto discovery per Ethernet segment route withdrawal is received for a second peer servicing a multi-homed host. In one or more embodiments of the invention, the peer is connected to the multi-homed host via the Ethernet segment through which the second peer is connected to the multi-homed host. In one or more embodiments of the invention, the Peer may update its forwarding table in response to receiving the type-1 route withdrawal.

In Step 302, a determination is made about whether a type-2 route withdrawal has been received from the second peer. In one or more embodiments of the invention, the type-1 route and the type-2 route are both associated with an Ethernet link of the Ethernet segment. The Ethernet link may directly connect the second peer and the multi-homed host. If the type-2 route has been received, the method may end following Step 302. If the type-2 route has not been received, the method may proceed to Step 304.

In one or more embodiments of the invention, the peer may wait a predetermined amount of time during Step 302 while waiting for a type-2 route before making the determination regarding whether the type-2 route withdrawal has been received. The predetermined amount of time may be, for example, two update cycles. Other predetermined amount of time may be used without departing from the invention.

In one or more embodiments of the invention, the peer may not wait a predetermined amount of time during Step 302. For example, the determination may be made immediately. In such a scenario, Step 302 may not be performed and the method may immediately proceed to Step 304 following Step 300.

In Step 304, a determination is made about whether a type-2 route advertisement has been obtained by the peer after the type-1 route withdrawal. In one or more embodiments of the invention, the type-2 route advertisement is associated with the type-1 route. For example, both the type-1 and the type-2 route may be associated with an Ethernet link of the Ethernet segment that has failed. In other words, the peer may determine whether the type-1 route withdrawal and the type-2 route advertisement are related. If a type-2 route advertisement has been received but is unrelated to the type-1 route withdrawal, the peer may proceed as though a type-2 route advertisement has not been received.

In one or more embodiments of the invention, the type-2 route advertisement is obtained from the second peer. If a type-2 route advertisement has been obtained, the method may proceed to Step 306. If a type-2 route advertisement has not been obtained, the method may proceed to Step 320 of FIG. 3B.

In one or more embodiments of the invention, when a peer makes the determination of Step 300 immediately, Step 304 may not be performed and the method may proceed directly to Step 306.

In Step 306, an Internet protocol address from the type-2 route advertisement is obtained.

In Step 308, a media access control address of the multi-homed host is locally obtained from the multi-homed host. In one or more embodiments of the invention, the media access control address is locally obtained by the peer by performing an Ethernet auto discovery protocol. Locally obtained may mean by a discovery protocol performed by the peer. The method may be, for example, packet snooping. For example, the multi-homed host may send the peer media access control frames that include or otherwise indicate the media access control address of the multi-homed host. Other auto discovery protocols may be used without departing from the invention.

In Step 310, the packet forward behavior of the peer is updated using both of the media access control address and the internet protocol address to obtain an updated forwarding table. In one or more embodiments of the invention, the media access control address and the internet protocol address, e.g., a binding between the two, may be used to modify the forwarding behavior of the Peer. The forwarding behavior may be changed to forward packets destined for the multi-homed host toward the multi-homed host.

In one or more embodiments of the invention, the routing table is updated to include a type-2 route based on the locally obtained media access control address and the Internet protocol address. The updating may include deleting an existing type-2 route from the forwarding table or adding a new type-2 route to the forwarding table.

The forwarding table may be updated using additional network connectivity information, other than media access control address and the Internet protocol address without departing from the invention.

While the forwarding behavior of the peer has been described as being updated by modifying a forwarding table, other methods of modifying the forwarding behavior of the peer may be used without departing from the invention. For example, different data structures that control the forwarding behavior of the peer may be updated rather than a forwarding table.

In Step 312, the peer advertises the media access control address and the Internet protocol address as a type-2 route. In one or more embodiments of the invention, advertising the type-2 route includes sending notifications to other peers of the type-2 route. Doing so may cause the other peers to update their routing tables and associated packet forwarding behavior based on the advertised type-2 route.

In Step 314, the peer forwards packets using the updated routing table. For additional details regarding forwarding packets using an updated routing table, refer to the discussion with respect to Step 212 of FIG. 2A.

In one or more embodiments of the invention, forwarding the packets using the updated routing table results in packets being directed toward the multi-homed peer being routed toward the multi-homed host via a second Ethernet link of the Ethernet segment. The second Ethernet link may directly connect the peer to the multi-homed host. In one or more embodiments of the invention, the peer utilizes the portion of the forwarding table that was updated based on the Internet protocol address of Step 306 and the media access control address of Step 308. The method may end following Step 314.

Figure 3B:
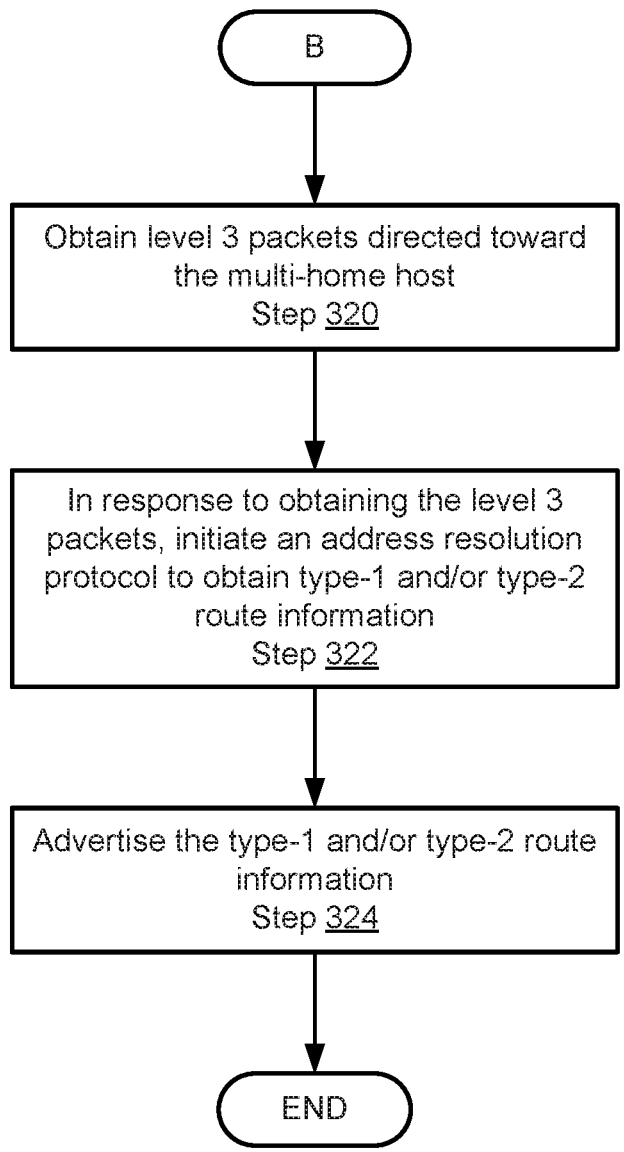
FIG. 3B shows a continuation of the flowchart of FIG. 3A.

Returning to Step 304, the method may proceed to Step 320 of FIG. 3B following Step 304. FIG. 3B shows a continuation of the flowchart of FIG. 3A in accordance with one or more embodiments of the invention.

In Step 320, layer-3 packets directed toward the multi-homed host is obtained. In one or more embodiments of the invention, the layer-3 packets are obtained from a third peer, i.e., a peer in a second virtual local area network separate from the virtual local area network in which the peer and second peer reside. The third peer may only be connected to the peer via a core network. In other words, the layer-3 packets must be routed and cannot be bridged to the peer.

In one or more embodiments of the invention, the layer-3 packets are packets from a second host directed toward the multi-homed host. The second host may reside in the second virtual local area network. The layer-3 packets may be directed toward the multi-homed host based on the type-5 route advertised in Step 200 of FIG. 2A. In other words, the second host may send packets to the multi-homed host. The third peer may forward the packets toward the multi-homed host using the type-5 route. In such a scenario, the packets may be forwarded toward the peer and the second peer by the third peer because of equal cost multi-path or other load distribution algorithms.

In Step 322, the peer initiates an address resolution protocol to obtain type-1 and/or type-2 route information in response to obtaining the layer-3 packets. In one or more embodiments of the invention, obtaining the type-1 route information is performed by performing an auto discovery for the Ethernet link between the Peer and the multi-homed host.

In one or more embodiments of the invention, acquiring the type-2 route enables the peer to identify a binding between the media access control address and the internet protocol address associated with the multi-homed host. By doing so, the peer may make the identification without having to invoke other network connectivity discovery mechanisms that are both computing resource intensive and time consuming. Consequently, one or more embodiments of the invention provide an improved peer that restores network communications in response to an Ethernet link failure when compared to contemporary Peers in an EVPN.

In Step 324, the type-1 and/or type-2 route information obtained in Step 322 is advertised. In one or more embodiments of the invention, the route information is advertised to other peers of an EVPN. By advertising the route information, the other peers of the EVPN may more quickly restore connectivity between the second host and the multi-homed host when an Ethernet link of an Ethernet segment used to connect the aforementioned hosts fails. Thus, embodiments of the invention may improve the field of network communications by providing an adaptive network rerouting mechanism as disclosed in the methods shown in the flowcharts of FIGS. 2A-3B. The method may end following Step 324.

Figure 4A:
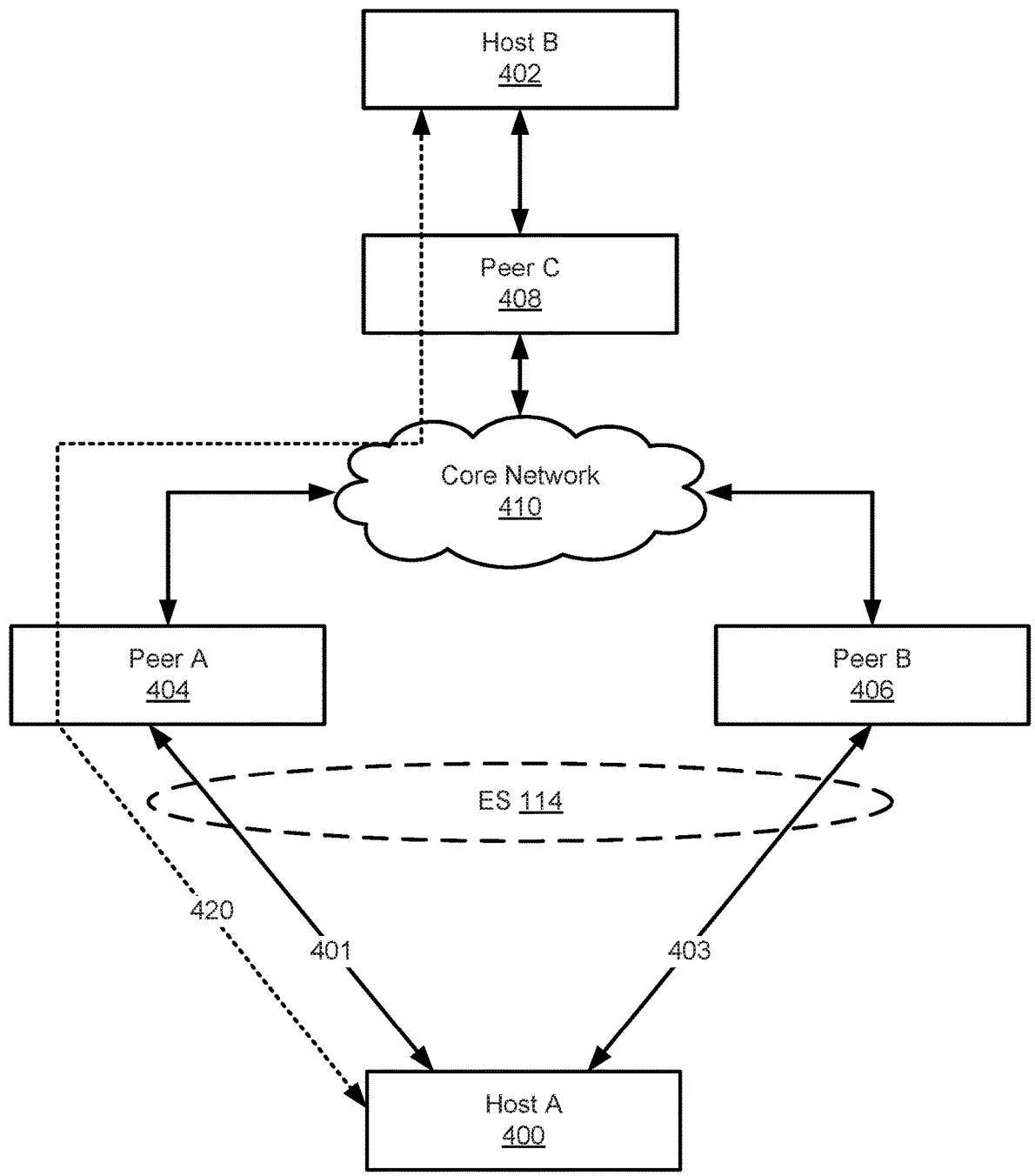
FIG. 4A shows a diagram of a first example system.
Figure 4B:
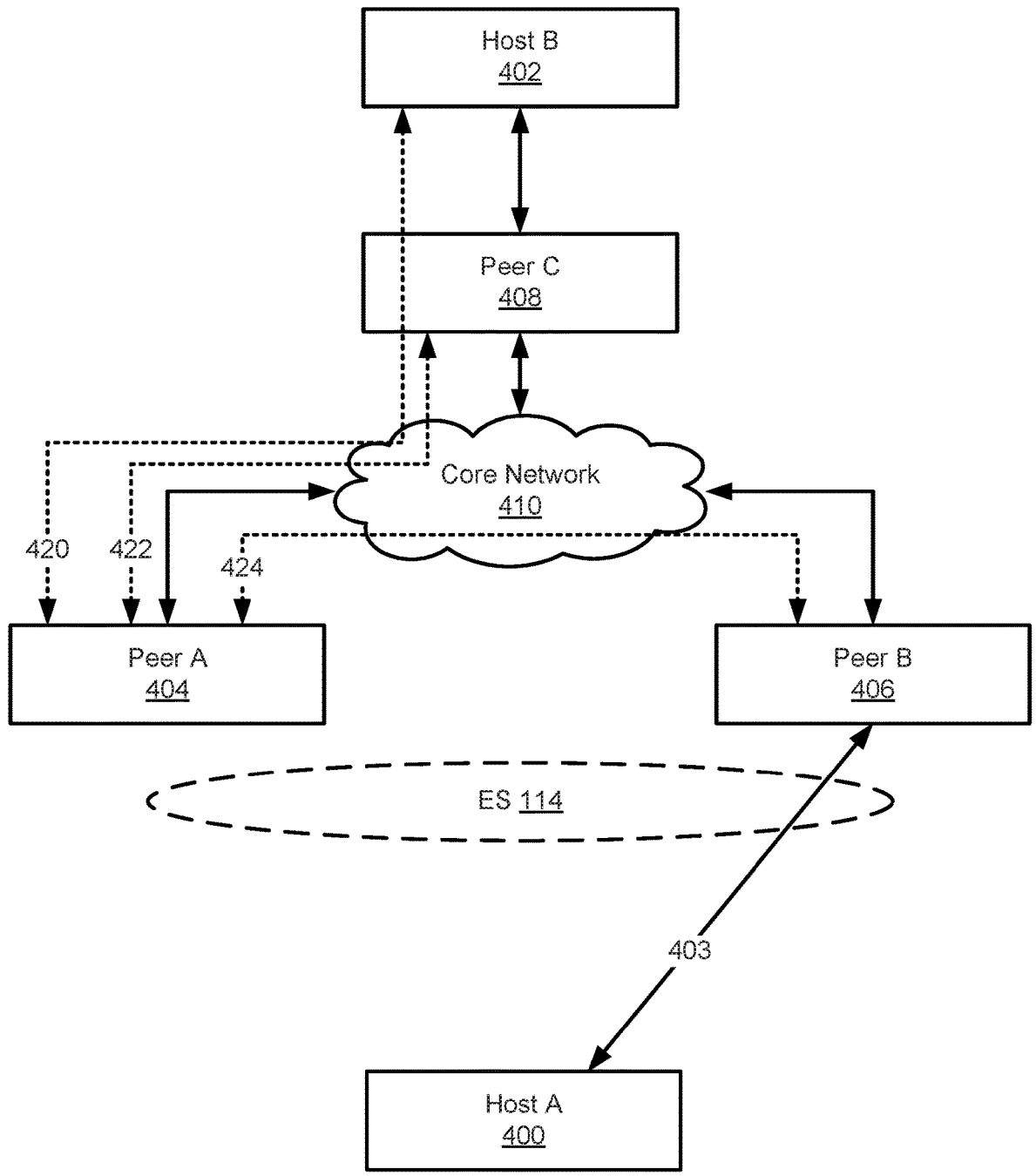
FIG. 4B shows a diagram of the first example system after an Ethernet segment has failed.
Figure 4C:
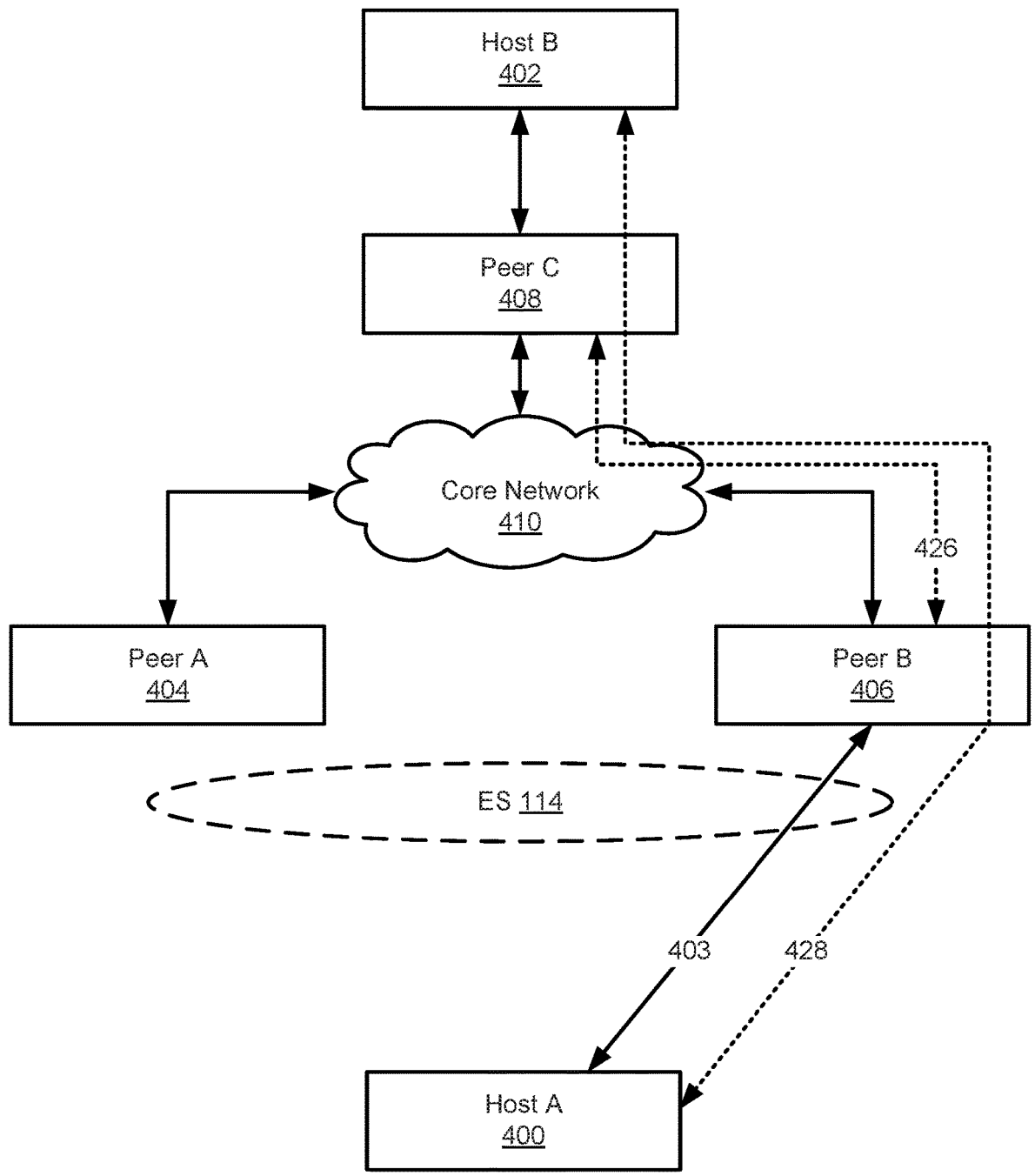
FIG. 4C shows a diagram of the first example system after the network has recovered connectivity between a first and a second host after the Ethernet segment failure.

FIGS. 4A-4C show a first example system in accordance with one or more embodiments of the invention. The following example, presented in conjunction with components shown in FIGS. 4A-4C, is for explanatory purposes only and not intended to limit the scope of the invention.

Referring to FIG. 4A, consider a scenario in which Host A (400) is multi-homed to Peer A (404) and Peer B (406). In this configuration, Host A (400) communicates with Peers A and B on Ethernet Segment A (114). Further, Peers A, B, and C (408) are part of a core network (410) that supports MPLS communications and, as such, communicate using the MPLS protocol.

Additionally, consider that when Host B (402) and Host A (400) initially started sending packets to each other via the Peers (404, 406, 408); a first path (420) was established. For example, Host A (400) may have initially started sending packets towards Peer A (404) which resulted in Peer C (408) receiving advertised routes corresponding to the first path (420). In turn, Peer C (408) sent return packets along the same route. Because of this network discovery process, Peer C (408) does not have the network connectivity information necessary to send packets to Host A (400) via Peer B (406).

In this topology, Host A (400), Peer A (404), and Peer B (406) are part of a first virtual local area network that supports layer-2 packets. Similarly, host B (402) and Peer C (408) are part of a second local area network that also supports layer-2 packets. In contrast, the core network (410) may support layer-3 packets, i.e., routed packets rather than bridged packets.

At this point in time, each of the peers start to advertise type-5 routes as discussed with respect to Step 200 of FIG. 2A.

Following the exchange of type-5 routes, the Ethernet link (401) fails. FIG. 4B shows a diagram of the system of FIG. 4A after the failure of the Ethernet link. As seen from FIG. 4B, Host B (402) continues to send packets toward Host A (400) via Peer A (404).

In response to the Ethernet link failure, Peer A (404) withdraws a type-1 auto discovery per Ethernet segment route associated with the Ethernet link (401, FIG. 4A) by sending advertisements to Peers B (406) and C (408) via a third path (424) and a fourth path (422), respectively. The third path (424) is merely included for explanatory purposes. The path between Host A (400) and Host B (402) may follow any route without departing from the invention. After withdrawing the type-1 route, Peer A (404) continues to advertise a type-2 route associated with the Ethernet link (401, FIG. 4A) by sending advertisements to Peers B (406) and C (408) via the third path (424) and the fourth path (422), respectively.

Peer B (406) locally discovers a media access control address associated with host A (400) after determining that a type-1 route has been withdrawn while the associated type-2 route is still being advertised. Using the media access control address and the Internet protocol address of the type-2 route, Peer B (406) advertises a new type-2 route as illustrated in FIG. 4C. In FIG. 4C, Peer B (406) performs the advertisement via a fifth path (426). The advertisement may be made to other peers without departing from the invention. As seen in FIGS. 4B and 4C, Peer B (406) is able to identify the new route without needing to construct the new type-2 route which would incur significant network resources and time for acquisition of the components of the type-2 route. In other words, Peer B (406) may advertise a media access control address and internet protocol address in a type-2 route using a stale type-2 route from Peer A (404) without relying on discovery tools.

Peer C (408), in response to receiving the advertising of the new type-2 route from Peer B (406), installs the route and begins routing packets directed toward Host A (400) to Peer B (406). By doing so, Peer C (408) is able to route packets towards Host A (400) via a sixth path (428) without performing network discovery protocols.

The first example ends after the sixth path (428) is established.

While embodiments of the invention have been discussed with respect to a multi-homed host, embodiments of the invention may be used with other network topologies without departing from the invention. For example, embodiments of the invention may be used in scenarios where hosts are moved between peers, when not multi-homed, as illustrated in FIGS. 5A-5C and discussed below.

Figure 5A:
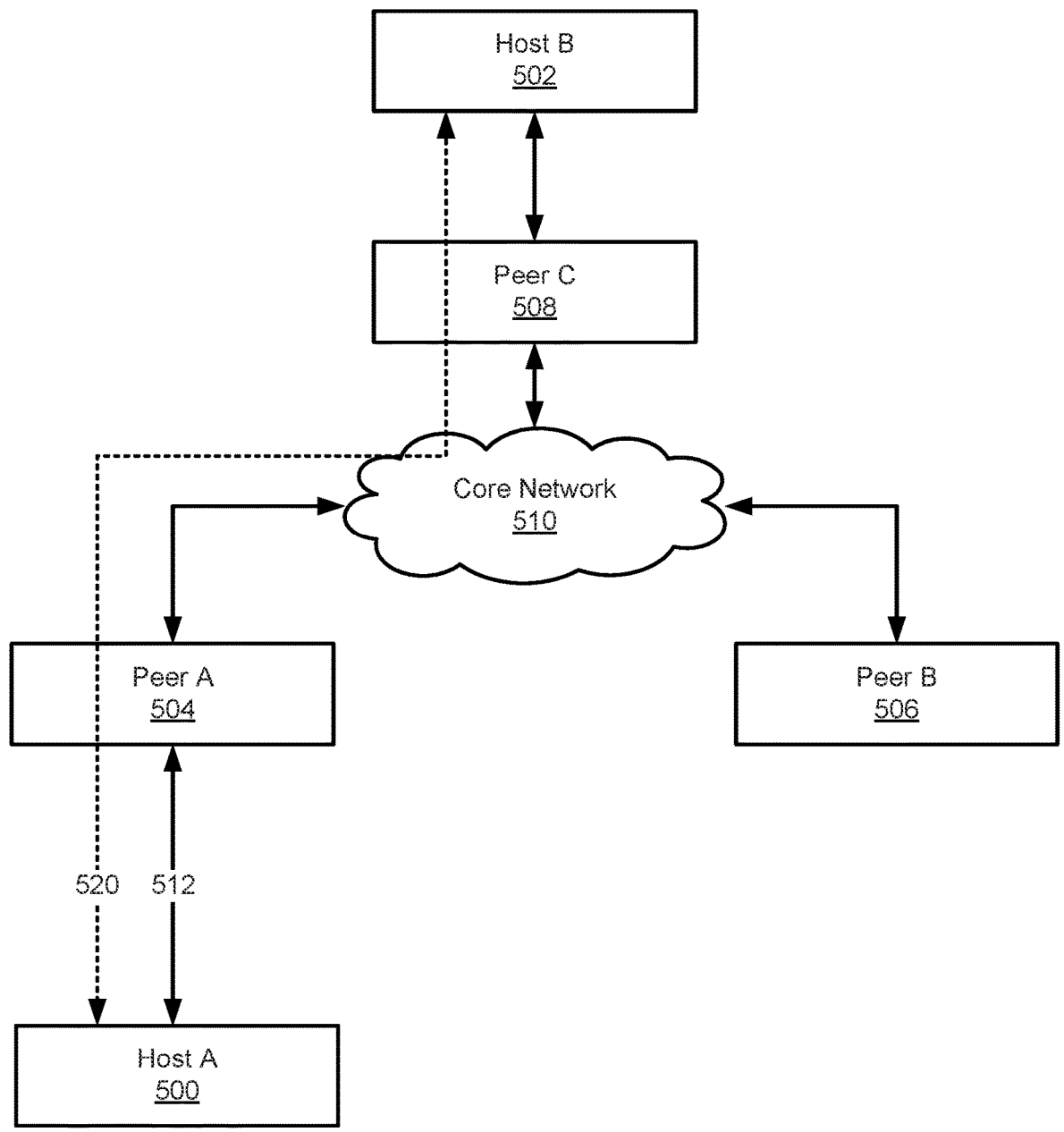
FIG. 5A shows a diagram of a second example system.
Figure 5B:
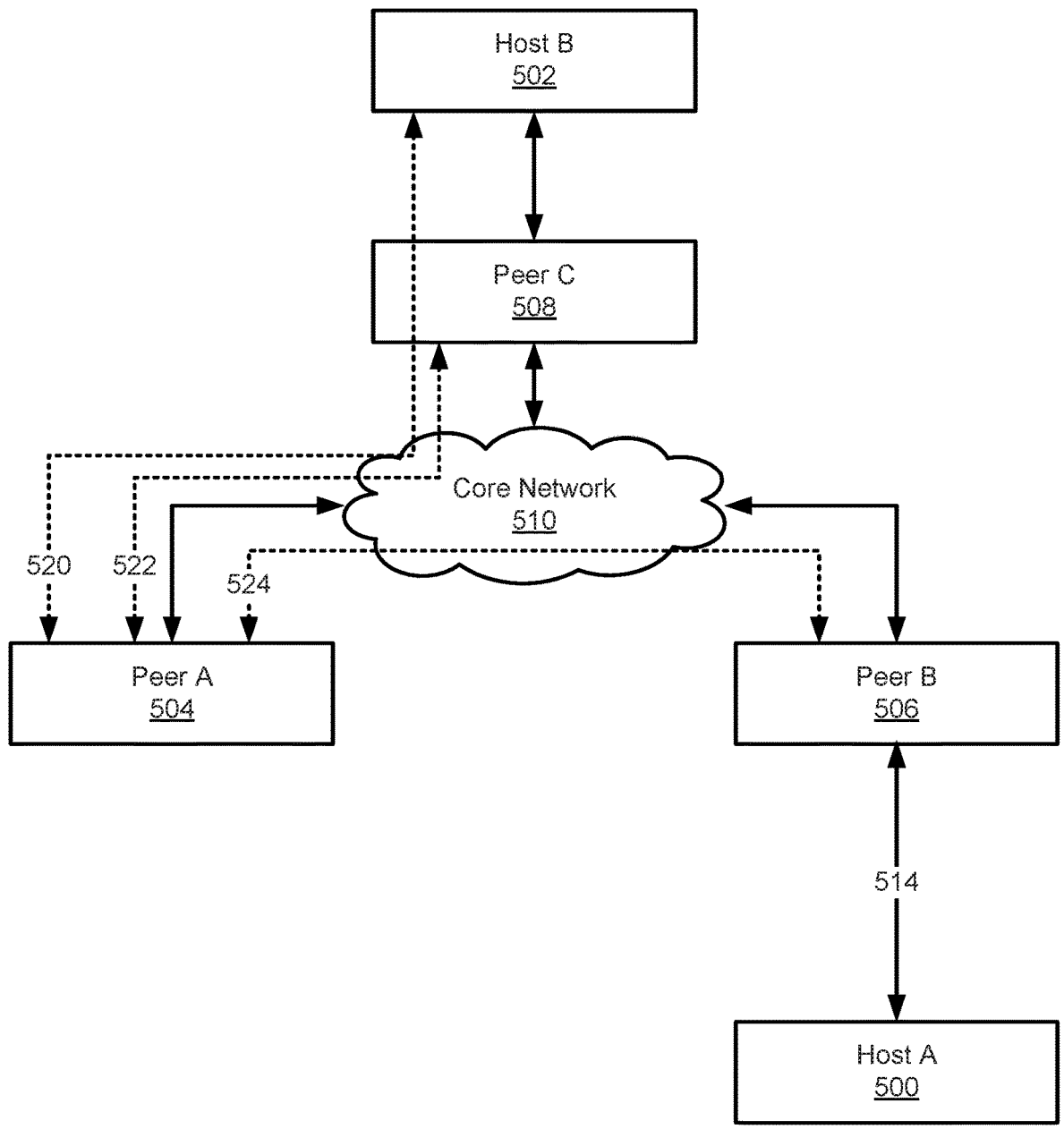
FIG. 5B shows a diagram of the second example system after a host has been disconnected from a first peer and reconnected to a second peer.
Figure 5C:
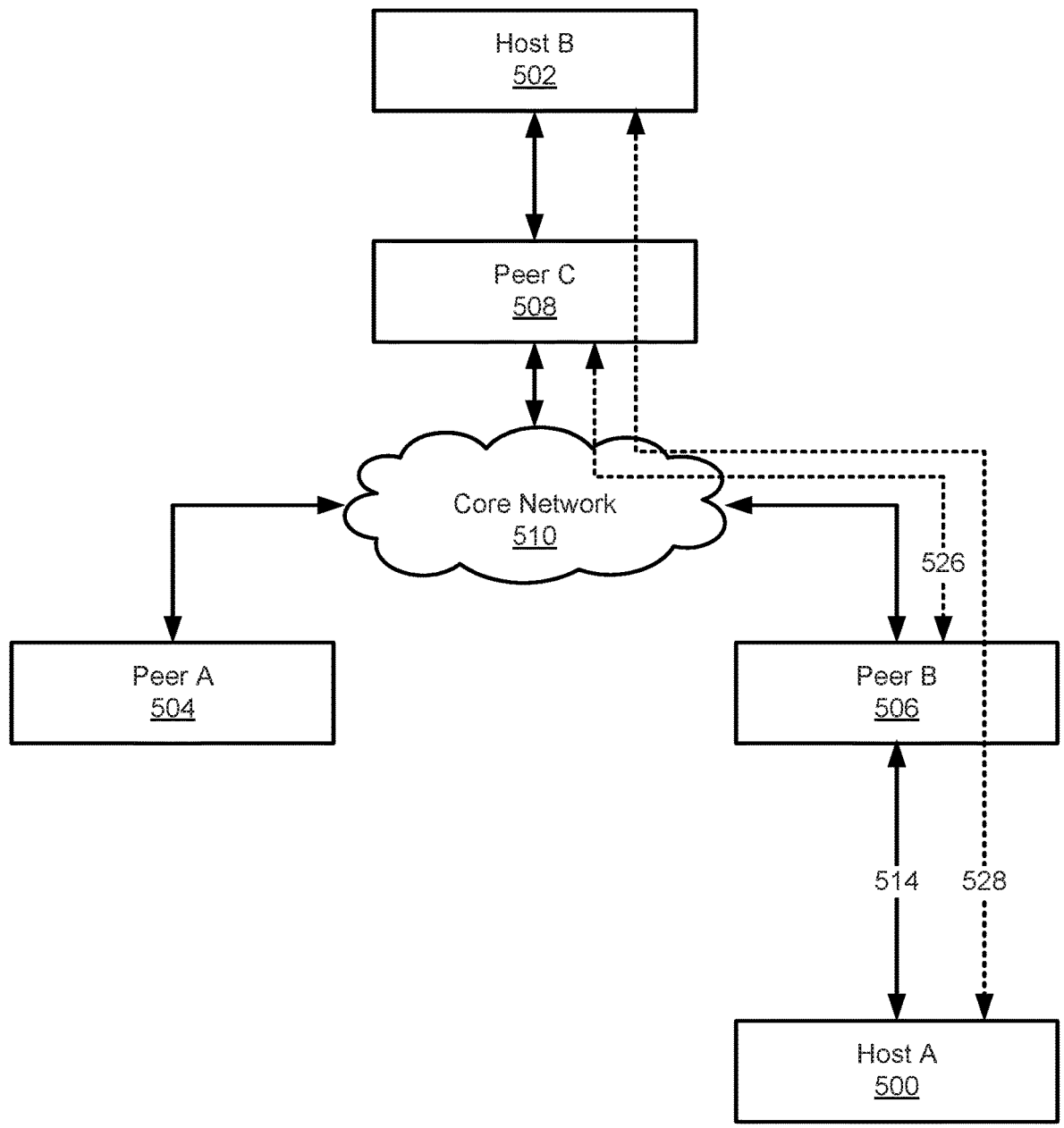
FIG. 5C shows a diagram of the second example system after the network has recovered connectivity between the host and a second host.

FIGS. 5A-5C show a second example system in accordance with one or more embodiments of the invention. The following second example, presented in conjunction with components shown in FIGS. 5A-5C, is for explanatory purposes only and not intended to limit the scope of the invention.

Referring to FIG. 5A, consider a scenario in which Host A (500) is connected to Peer A (504) via a first Ethernet link (512). Otherwise, the topology of FIG. 5A is identical to that of FIG. 4A.

At this point in time, each of the peers (504, 506, and 508) start to advertise type-5 routes as discussed with respect to Step 200 of FIG. 2A. Peer A (504) may also advertise type-2 routes to the other peers. Following the exchange of type-5 routes, the connectivity of host A (500) is modified to be connected to Peer B (506) via a second Ethernet segment (514) as shown in FIG. 5B. In this topology, the connectivity between host B (502) and host A (500) via a first path (520) is severed.

After Host A (500) relocates to Peer B (506), Peer A (504) continues to advertise a type-2 route associated with the first Ethernet link (512, FIG. 5A) by sending advertisements to Peers B (506) and C (508) via the third path (524) and the fourth path (522), respectively.

Peer B (506) locally discovers a media access control address associated with host A (500) when host A (500) begins sending packets after it has moved. Using the media access control address and the Internet protocol address of the type-2 route from peer A (504), Peer B (506) advertises a new type-2 route as illustrated in FIG. 5C. In FIG. 4C, Peer B (506) performs the advertisement via a fifth path (526). The advertisement may be made to other peers without departing from the invention. As seen in FIGS. 5B and 5C, Peer B (506) is able to identify the new route without needing to discover the new type-2 route which would incur significant network resources and time.

Peer C (508), in response to receiving the advertising of the new type-2 route from Peer B (506), installs the route and begins routing packets directed toward Host A (500) to Peer B (506). By doing so, Peer C (508) is able to route packets towards host A (500) via a sixth path (528) without performing network discovery protocols.

The second example ends after the sixth path (528) is established.

One or more embodiments of the invention may address the problem of network reconfiguration in a dynamically changing network environment. For example, embodiments of the invention may provide a method for a network to reconfigure itself more quickly when compared to contemporary methods of network reconfiguration. By continuing to advertise a stale type-2 route in response to an Ethernet link failure, embodiments of the invention may enable a network to reconfigure itself without performing network discovery protocols which may be both resource intensive and time consuming. In contrast, contemporary network protocol require that both type-1 and type-2 routes be withdrawn in response to an Ethernet link failure. Thus, embodiments of the invention may provide a new system and method for performing network communications in a dynamic environment.

Additionally, embodiments of the invention may provide an improved network topology that advertising type-5 routes based on integrated routing and bridging interfaces in an Ethernet virtual private network. By doing so, even in the case of a single route across a core network scenario, a peer in accordance with embodiments of the invention is still able to route packets towards a multi-homed host connected via a disabled Ethernet link. By doing so, embodiments of the invention may improve the rate of packet forwarding in link failure scenarios because the peers of the Ethernet virtual private network are not required to perform network discovery protocol in response to type-1 route withdrawals.

While embodiments of the invention have been described above as improving one or more technologies, embodiments of the invention are broadly applicable to a range of network technologies and should not be limited by the exemplary description of problems solved by and advantages of the embodiments of the invention described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating an Ethernet virtual private network, comprising:
   advertising, by a peer of the Ethernet virtual private network, virtual local area network routing information based on an integrated routing and bridging interface of the peer;
   making a determination that an Ethernet segment directly connecting a multi-homed host and the peer has failed;
   in response to the determination:
      withdrawing, by the peer, a first route of a first type of route associated with the Ethernet segment;
      after the withdrawing of the first route of the first type of route associated with the Ethernet segment:
         maintaining, by the peer and while the Ethernet segment has failed, a first route of a second type of route associated with both the failed Ethernet segment and the first route of the first type for a predetermined time after the Ethernet segment has failed, wherein the first route of the second type comprises the failed Ethernet segment;
         prior to expiration of the predetermined time and prior to the peer withdrawing the first route of the second type advertising the first route of the second type as being available to at least a second peer that is directly connected to the multi-homed host; and
      forwarding, by the peer, a packet while the Ethernet segment has failed.

2. The method of claim 1, wherein forwarding, by the peer, the packet while the Ethernet segment has failed comprises:
   obtaining, by the peer, a second route of a second type of route associated with the multi-homed host after withdrawal of the first route of the first type of route;
   withdrawing, by the peer, the first route of the second type of route in response to obtaining the second route of the second type of route;
   updating a forwarding table of the peer based on the second route of the second type of route to obtain an updated forwarding table; and
   forwarding, by the peer, the packet using the updated forwarding table.

3. The method of claim 2, wherein the second route of the second type of route is obtained from the second peer directly connected to the multi-homed host via the Ethernet segment.

4. The method of claim 1, wherein forwarding, by the peer, the packet while the Ethernet segment has failed comprises:
   making a second determination, by the peer, that a second route of the second type of route associated with the first route of the second type of route has not been obtained within a predetermined time after the withdrawal of the first route of the first type of route;
   withdrawing, by the peer, the first route of the second type of route in response to the second determination;
   obtaining the second route of the second type of route from the second peer;
   updating a forwarding table of the peer based on the second route of the second type of route to obtain an updated forwarding table; and
   forwarding, by the peer, the packet using the updated forwarding table.

5. The method of claim 4, wherein obtaining the second route of the second type of route from the second peer directly connected to the multi-homed host via the Ethernet segment comprises:
   receiving, by the peer, an advertisement from the second peer while receiving a second packet routed toward the multi-homed host using the virtual local area network routing information,
   wherein the advertisement comprises the first route of the second type of route.

6. The method of claim 1, wherein advertising the first route of the second type further comprises providing an internet protocol address for the multi-homed host and a media access control address for the multi-homed host to the second peer.

7. The method of claim 6, further comprising:
   prior to the Ethernet segment failure, advertising the first route of the first type by providing, at least, an Ethernet segment identifier for the failed Ethernet segment to the second peer,
   wherein the internet protocol address for the multi-homed host is not provided as part of advertising the first route of the first type.

8. A non-transitory computer readable medium comprising computer readable program code, which when executed by a computer processor enables the computer processor to perform a method for operating an Ethernet virtual private network, the method comprising:
   advertising, by a peer of the Ethernet virtual private network, virtual local area network routing information based on an integrated routing and bridging interface of the peer;
   making a determination that an Ethernet segment directly connecting a multi-homed host and the peer has failed;
   in response to the determination:
      withdrawing, by the peer, a first route of a first type of route associated with the Ethernet segment;
      after the withdrawing of the first route of the first type of route associated with the Ethernet segment:
         maintaining, by the peer and while the Ethernet segment has failed, a first route of a second type of route associated with both the failed Ethernet segment and the first route of the first type for a predetermined time after the Ethernet segment has failed, wherein the first route of the second type comprises the failed Ethernet segment;
         prior to expiration of the predetermined time and prior to the peer withdrawing the first route of the second type advertising the first route of the second type as being available to at least a second peer that is directly connected to the multi-homed host; and
      forwarding, by the peer, a packet while the Ethernet segment has failed.

9. The non-transitory computer readable medium of claim 8, wherein forwarding, by the peer, the packet while the Ethernet segment has failed comprises:
   obtaining, by the peer, a second route of a second type of route associated with the multi-homed host after withdrawal of the first route of the first type of route;
   withdrawing, by the peer, the first route of the second type of route in response to obtaining the second route of the second type of route;
   updating a forwarding table of the peer based on the second route of the second type of route to obtain an updated forwarding table; and forwarding, by the peer, the packet using the updated forwarding table.

10. The non-transitory computer readable medium of claim 9, wherein the second route of the second type of route is obtained from the second peer.

11. The non-transitory computer readable medium of claim 8, wherein forwarding, by the peer, the packet while the Ethernet segment has failed comprises:
    making a second determination, by the peer, that a second route of the second type of route associated with the first route of the second type of route has not been obtained within a predetermined time after the withdrawal of the first route of the first type;
    withdrawing, by the peer, the first route of the second type of route in response to the second determination;
    obtaining the second route of the second type of route from the second peer;
    updating a forwarding table of the peer based on the second route of the second type of route to obtain an updated forwarding table; and
    forwarding, by the peer, the packet using the updated forwarding table.

12. The non-transitory computer readable medium of claim 11, wherein obtaining the second route of the second type of route from the second peer directly connected to the multi-homed host via the Ethernet segment comprises:
    receiving, by the peer, an advertisement from the second peer while receiving second packet routed toward the multi-homed host using the virtual local area network routing information,
    wherein the advertisement comprises the second type of route.

13. The non-transitory computer readable medium of claim 8, wherein advertising the first route of the second type further comprises providing an internet protocol address for the multi-homed host and a media access control address for the multi-homed host to the second peer.

14. The non-transitory computer readable medium of claim 13, further comprising:
    prior to the Ethernet segment failure, advertising the first route of the first type by providing, at least, an Ethernet segment identifier for the failed Ethernet segment to the second peer,
    wherein the internet protocol address for the multi-homed host is not provided as part of advertising the first route of the first type.

15. A peer of an Ethernet virtual private network, comprising:
    a storage for storing a forwarding table; and
    a processor programmed to:
        advertise virtual local area network routing information based on an integrated routing and bridging interface of the peer stored in the forwarding table;
        make a determination that an Ethernet segment directly connecting a multi-homed host and the peer has failed;
        in response to the determination:
            withdraw a first route of a first type of route associated with the Ethernet segment;
            after the withdrawing of the first route of the first type of route associated with the Ethernet segment:
                maintaining, by the peer and while the Ethernet segment has failed, a first route of a second type of route associated with both the failed Ethernet segment and the first route of the first type for a predetermined time after the Ethernet segment has failed, wherein the first route of the second type comprises the failed Ethernet segment;
                prior to expiration of the predetermined time and prior to the peer withdrawing the first route of the second type advertising the first route of the second type as being available to at least a second peer that is directly connected to the multi-homed host; and
            forward a packet while the Ethernet segment has failed using the forwarding table.

16. The peer of claim 15, wherein forwarding the packet while the Ethernet segment has failed comprises:
    obtaining a second route of the second type of route associated with the multi-homed host after withdrawal of the first route of the first type;
    withdrawing the first route of the second type of route in response to obtaining the second route of the second type of route;
    updating a forwarding table of the peer based on the second route of the second type of route to obtain an updated forwarding table; and
    forwarding the packet using the updated forwarding table.

17. The peer of claim 16, wherein the second route of the second type of route is obtained from the second peer directly connected to the multi-homed host via the Ethernet segment.

18. The peer of claim 15, wherein forwarding the packet while the Ethernet segment has failed comprises:
    making a second determination that a second route of the second type of route associated with the first route of the second type of route has not been obtained within a predetermined time after the withdrawal of the first route of the first type of route;
    withdrawing the first route of the second type of route in response to the second determination;
    obtaining the second route of the second type of route from the second peer; and
    updating a forwarding table of the peer based on the second route of the second type of route to obtain an updated forwarding table; and
    forwarding the packet using the updated forwarding table.

19. The peer of claim 15, wherein advertising the first route of the second type further comprises providing an internet protocol address for the multi-homed host and a media access control address for the multi-homed host to the second peer.

20. The peer of claim 19, further comprising:
    prior to the Ethernet segment failure, advertising the first route of the first type by providing, at least, an Ethernet segment identifier for the failed Ethernet segment to the second peer,
    wherein the internet protocol address for the multi-homed host is not provided as part of advertising the first route of the first type.

* * * * *